United States Patent
Saidi

(10) Patent No.: US 10,592,428 B1
(45) Date of Patent: Mar. 17, 2020

(54) NESTED PAGE TABLES

(71) Applicant: Amazon Technologies, Inc., Seattle, WA (US)

(72) Inventor: Ali Ghassan Saidi, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 15/717,808

(22) Filed: Sep. 27, 2017

(51) Int. Cl.
- G06F 12/00 (2006.01)
- G06F 12/1027 (2016.01)
- G06F 12/1009 (2016.01)
- G06F 9/455 (2018.01)
- G06F 12/0891 (2016.01)

(52) U.S. Cl.
CPC ...... G06F 12/1027 (2013.01); G06F 9/45558 (2013.01); G06F 12/0891 (2013.01); G06F 12/1009 (2013.01); G06F 2009/45583 (2013.01); G06F 2212/65 (2013.01); G06F 2212/68 (2013.01)

(58) Field of Classification Search
CPC ............ G06F 12/1027; G06F 9/45558; G06F 12/0891; G06F 12/1009; G06F 2009/45583; G06F 2212/65; G06F 2212/68
See application file for complete search history.

(56) References Cited

U.S. PATENT DOCUMENTS

| 2010/0058358 A1* | 3/2010 | Franke | G06F 12/1027 719/319 |
| 2014/0006681 A1* | 1/2014 | Chen | G06F 12/1027 711/3 |
| 2017/0116419 A1* | 4/2017 | Woodward | G06F 21/554 |
| 2018/0203801 A1* | 7/2018 | Leslie-Hurd | G06F 12/0837 |

* cited by examiner

*Primary Examiner* — Charles Rones
*Assistant Examiner* — Han V Doan
(74) *Attorney, Agent, or Firm* — Kilpatrick Townsend & Stockton LLP

(57) ABSTRACT

A translation buffer is provided in parallel to a translation lookaside buffer (TLB) to cache translations between intermediate physical addresses (IPAs) and pointers for entries in the TLB corresponding to the IPAs. The pointers can be used to identify and invalidate only certain entries in the TLB as compared to invalidating the whole TLB.

20 Claims, 7 Drawing Sheets

NESTED PAGE TABLES

BACKGROUND

Central processing units (CPUs) generally utilize translation lookaside buffers (TLBs) to cache page table translations from virtual addresses (VAs) to physical addresses (PAs) using page tables. In virtualized systems, nested page tables may be used to support a second level of translation associated with a guest physical address space. For example, the nested page tables may be used to map VAs to guest or intermediate PAs (IPAs) and to map the IPAs to the PAs. Generally, the mapping from the VAs to the IPAs is controlled by a guest operating system (OS) executing within a virtual machine (VM) and the mapping from the IPAs to the PAs is controlled by a hypervisor. Even though the PAs are derived from the IPAs, for a given VA, an entry storing a mapping between the VA and a PA corresponding to an underlying IPA cannot be easily found in the TLB.

BRIEF DESCRIPTION OF THE DRAWINGS

Various embodiments in accordance with the present disclosure will be described with reference to the drawings, in which.

DETAILED DESCRIPTION

Figure 1:
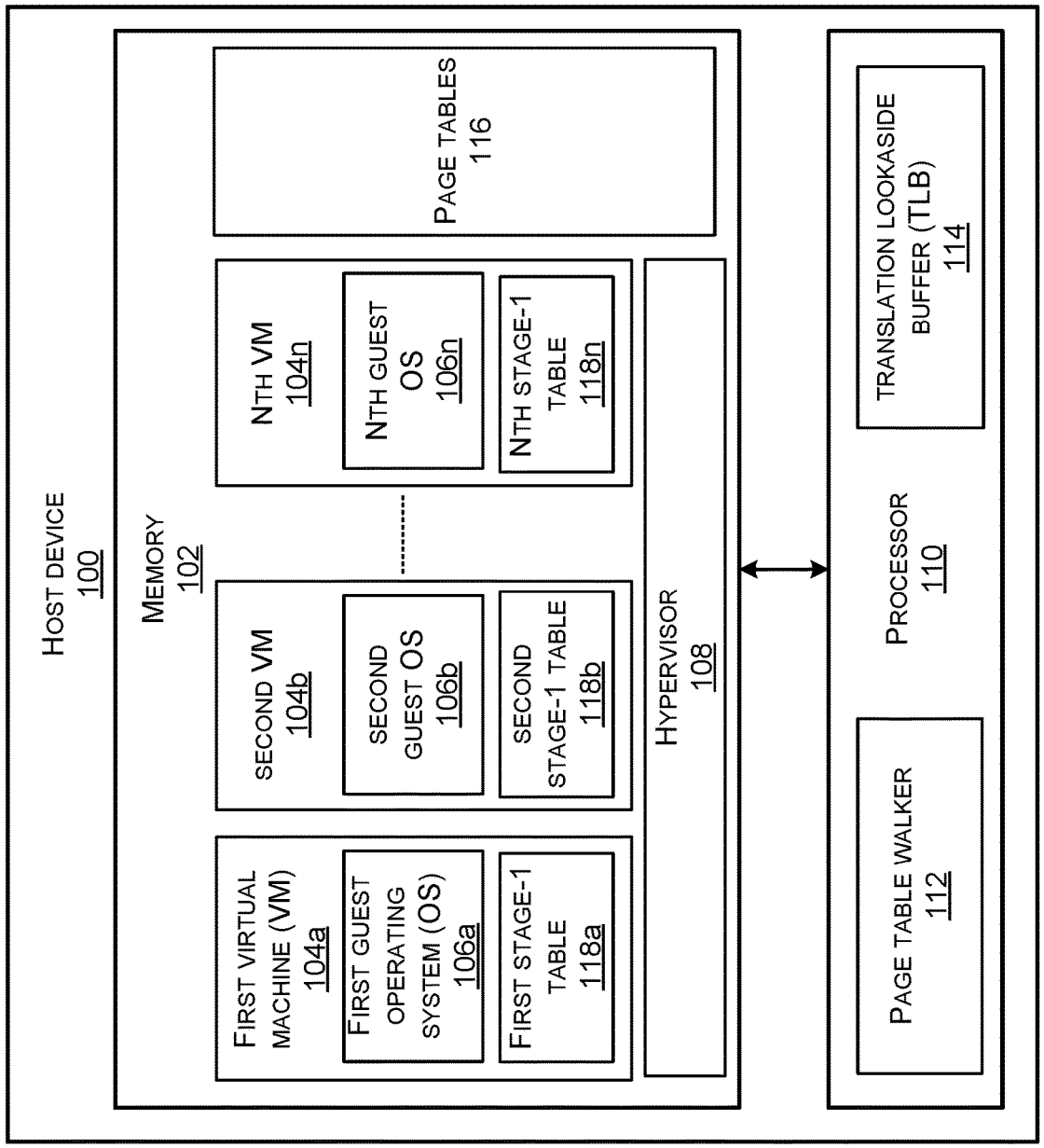
FIG. 1 illustrates a host device comprising a processor and a memory.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Generally speaking, virtualization is the creation of one or more logical systems from a single physical system. A hypervisor or a virtual machine manager (VMM) can emulate a single device as multiple virtual devices in a virtualized environment. A virtual machine (VM) may be any suitable emulation of a computer system that may be managed by the hypervisor. The hypervisor can also manage the flow of information between software, the virtualized hardware, and the physical hardware. Virtualization can allow multiple VMs to run on the same hardware system in their respective guest operating systems on a host device.

Translation lookaside buffers (TLBs) are used by a central processing unit (CPU) to cache page table translations from logical or virtual addresses (VAs) to physical addresses (PAs). In virtualized systems, where each guest operating system (OS) is running within a VM, the memory that is being allocated by the guest operating system is not the true physical memory of the system, but instead is an intermediate physical memory. For example, the guest OS may have access to a guest physical address space based on information the guest OS may have received during a boot up process. The intermediate physical memory is accessible using guest physical addresses (GPAs) or intermediate physical addresses (IPAs) in the guest physical address space. These IPAs may require a second level of translation, e.g., from the intermediate physical address to a physical memory address. In some implementations, nested page tables may be used to map VAs to the IPAs, and to map the IPAs to the PAs. For example, the nested page tables may include state-1 tables to store the mapping between the VAs and the IPAs, and stage-2 tables to store the mapping between the IPAs and the PAs.

Generally, the mapping from the VAs to the IPAs is controlled by the guest OS executing within the VM, and the mapping from the IPAs to the PAs is controlled by the hypervisor. However, the mappings stored in a TLB are indexed by the VAs and provide the PAs. Although a PA is derived from an IPA associated with a guest OS, for a given VA, an entry storing the mapping between the underlying IPA and the PA cannot be easily found in the TLB. This can be problematic when there is a change in the mapping between the IPA and the PA. For example, the hypervisor may have to modify the mapping between an IPA and a PA for a number of reasons, e.g., live migration of VMs, over commitment of the memory, activity tracking using a dirty bit, etc. In most instances, if the hypervisor has to modify the mapping between the IPA and the PA for a guest, the hypervisor has to invalidate or evict all the translations from the TLB for that guest. Thus, the guest may face a performance anomaly as the TLB refills itself and the system may experience increased traffic during that time.

Embodiments of the disclosed technologies can utilize an additional translation buffer in parallel to the main TLB. The additional translation buffer can be indexed by an intermediate physical address (IPA) and can provide a pointer to a main TLB entry storing a physical address (PA) derived from this IPA. When the hypervisor has to modify the mapping between an IPA and a PA, the CPU can search the translation buffer using the IPA as the index. The translation buffer can provide the pointer which points to an entry in the main TLB corresponding to that IPA. For example, modifying an entry may include invalidating or evicting the entry. In some embodiments, based on the configuration of the main TLB and the translation buffer, the hypervisor may over-invalidate the TLB entries. For example, instead of invalidating one entry, the hypervisor may invalidate a group of entries. In some implementations, the hypervisor may invalidate all the entries in a way, or in all the ways associated with a set, in the main TLB that includes the given entry. Thus, in some embodiments, over-invalidating the entries in the main TLB may still be beneficial as compared to invalidating all the entries.

FIG. 1 illustrates a host device 100 comprising a processor 110 and a memory 102. The host device 100 may be part of a computer system.

The processor 110 may be configured to execute a plurality of instructions stored in the memory 102. For example, the plurality of instructions may include instructions for a plurality of VMs 104a-104n, and a hypervisor 108. Each of the VMs 104a-104n may be configured to execute one or more independent guests. For example, the first VM 104a may execute a first guest OS 106a, the second VM 104b may execute a second guest OS 106b, and the Nth VM 104n may execute an Nth guest OS 106n. In some embodiments, the processor 110 architecture may include a plurality of processing cores, and may be based on x86 (e.g., Xeon, Pentium, etc.), ARM®, PowerPC, or any suitable architecture. The instructions may be stored on a computer-readable storage medium, for example, in the form of a computer program. The computer-readable storage medium may be non-transitory.

The memory 102 may be internal or external to the host device 100. For example, the memory 102 may be a RAM, ROM, Electrically Erasable Programmable Read-Only Memory (EEPROM), flash memory or any suitable storage media. The memory 102 may be accessible using physical addresses (PAs) that may be mapped in an address space of the processor 110. The memory 102 may also store a plurality of page tables 116 for generating translations between a logical or a virtual address space, and a physical address space. In some implementations, the page tables 116 may include page tables for translations between the VAs and PAs, and also the stage-2 tables for translations between the IPAs and the PAs. The page tables 116 may be implemented in the memory 102 using any suitable data structure, e.g., pointers, indices, trees or hierarchies. For example, in one implementation, the page tables 116 may include a multi-level tree of 4K tables and each page table entry can be a page directory entry with a pointer for a lower level page table. The page tables 116 may be implemented using a format compatible with the architecture and implementation of the host device 100.

The hypervisor 108, also referred to as a virtual machine manager (VMM), may be configured to emulate multiple virtual devices on a single physical device in a virtualized environment. The hypervisor 108 may also manage the flow of information between software, the virtualized hardware, and the physical hardware. The hypervisor 108 may be configured to create, start, monitor, stop, or delete each of the VMs 104a-104n, and may execute at a higher privilege level than the VMs 104a-104n. In some implementations, the hypervisor 108 can manage access controls, resources, scheduling, isolation, etc., for the VMs 104a-104n that execute their respective guest operating systems. The hypervisor 108 may be implemented as a software layer or as code embedded in a firmware on the apparatus 100. The hypervisor 108 may be a type-2 hypervisor (e.g., hosted hypervisor) or a type-1 hypervisor (e.g., bare-metal hypervisor), or may include any other suitable implementation.

Each of the VMs 104a-104n may be any suitable emulation of a computer system that may be managed by the hypervisor 108. In virtualized systems, each of the guest OS executing within a respective VM may have a view of a physical address space that may be different than the true physical address space. For example, the guest physical address space may be the physical address space the guest OS may have been assigned by the host during a boot up process. Thus, each virtualized guest OS executing inside the respective VM may create page tables to translate the VAs from a virtual address space into corresponding intermediate PAs from the physical address space assigned to that guest by the host. Thus, a two stage translation may need to be performed to translate from a virtual address to an intermediate physical address and from the intermediate physical address to the physical memory address. In some embodiments, stage-1 translations between the VAs and IPAs may be stored in the respective guest physical address space associated with each VM, and stage-2 translations between the IPAs and the PAs may be stored in the page tables 116. As shown in FIG. 1, a first stage-1 table 118a may be used to store the first stage translations between the VAs and the IPAs associated with the first guest OS 106a, a second stage-1 table 118b may be used to store the first stage translations between the VAs and the IPAs associated with the second guest OS 106b, and an Nth stage-1 table 118n may be used to store the first stage translations between the VAs and the IPAs associated with the Nth guest OS 106n.

The processor 110 may include a page table walker 112 and a translation lookaside buffer (TLB) 114. The processor 110 may utilize the TLB 114 to cache page table translations from the VAs to PAs. In different embodiments, the TLB 114 may include multiple levels of translations specific to the system architecture and implementation. The TLB 114 may include one or more hardware translation tables, software translation tables, or a combination thereof. For example, in some embodiments, the TLB 114 may include a micro TLB and a main TLB. The micro TLB may cache a smaller number of translations as compared to the main TLB. Thus, in some embodiments, the micro TLB may be searched first before looking for a match in the main TLB. In some implementations, the TLB 114 can be an associative cache. For example, the TLB 114 may be implemented as a fully associative, two-way set associative, a four-way set associative, an eight-way set associative or using any other suitable implementation.

When an access to the memory 102 is requested by a VM from the VMs 104a-104n, using a VA, the TLB 114 may be searched for a mapping, e.g., if the mapping is not found in the micro TLB, if present. If a match is found (a TLB hit), a corresponding physical memory address (PA) is provided by the TLB 114. If the mapping does not exist in the TLB 114 (a TLB miss), a page table walk may be performed by the page table walker 112 to provide the mapping. The page table walker 112 may be configured to calculate the PA using the mapping stored in the page tables 116, and update the TLB 114 to include the calculated PA. In some instances, the TLB 114 may be full, and a replacement policy (e.g., least recently used) may be used to replace an existing entry with the new entry.

In some embodiments, the TLB 114 and the page table walker 112 may be part of a memory management unit (not shown). The memory management unit may be on chip with the processor 110 or off-chip. The TLB 114 can generally be managed using a programming interface e.g., through register access or in-memory queue. For example, the programming interface can allow TLB initialization, invalidation of specific contexts or TLB entries. It will be noted that even though FIG. 1 shows the page table walker 112 and the TLB 114 integrated with the processor 110, other implementations are possible without deviating from the scope of the disclosed technologies. For example, in some embodiments, the processor 110, the page table walker 112 and the TLB 114 may be implemented as separate components, e.g., as part of a system-on-chip (SoC).

In some instances, the host (e.g., the hypervisor 108) may have to change the mapping between the IPA and the PA for a number of different reasons. For example, in one instance, the host may be overcommitting memory on a system and may determine that a particular guest may not need all the memory allocated to that guest, e.g., if certain guest memory pages have not been updated at all or for a long time. Therefore, the host may want to change the mapping between the IPA and the PA to redistribute the guest memory accordingly.

In another instance, the host may want to track memory accesses in a live migration of a VM using the dirty bits. In some implementations, a dirty bit may be set when a page is written by a guest. The live migration of a VM may refer to the process of moving a running VM or application between different physical machines without disconnecting the client or application. Activity of the migrating VM may be tracked so that the VM memory states can be transferred from the source machine to the destination machine. The VM memory states can be transferred using a pre-copy memory migration. In yet another instance, the host may want to migrate a VM from one type of memory to another type of memory.

As discussed earlier, the memory that is being allocated by the guest operating system is not the true physical memory of the system, but instead is an intermediate physical memory. The intermediate physical memory is accessible using the IPAs in the guest physical address space. These IPAs may require a second level of translation, e.g., from the intermediate physical address to a physical memory address. Generally, the mapping from the VAs to the IPAs may be controlled by the guest executing within the VM, and the mapping from the IPAs to the PAs may be controlled by the hypervisor 108. Thus, when the hypervisor 108 has to change an underlying mapping between an IPA and the PA for any reason, the hypervisor 108 has to invalidate all the entries in the TLB 114 for that guest since the hypervisor 108 may not be aware of the VA corresponding to that IPA. For example, in some instances, different guest pages associated with different VAs may be mapped to the same PA among multiple entries in the TLB 114. Therefore, even though the PA is derived from the IPA associated with the guest, an entry corresponding to the IPA cannot be easily found in the TLB 114 to reflect a change in the IPA by the hypervisor 108. As a result of invalidating all the TLB entries, the guest may face a performance anomaly as the TLB 114 refills itself and the system may experience increased traffic during that time.

Some embodiments of the disclosed technologies may utilize an additional translation buffer, in parallel to the main TLB, which can provide a pointer to a main TLB entry corresponding to the IPA. The hypervisor 108 can look up the entry in the TLB 114 using the pointer and can invalidate that entry instead of invalidating the whole TLB 114. This is further explained with reference to FIG. 2.

Figure 2:
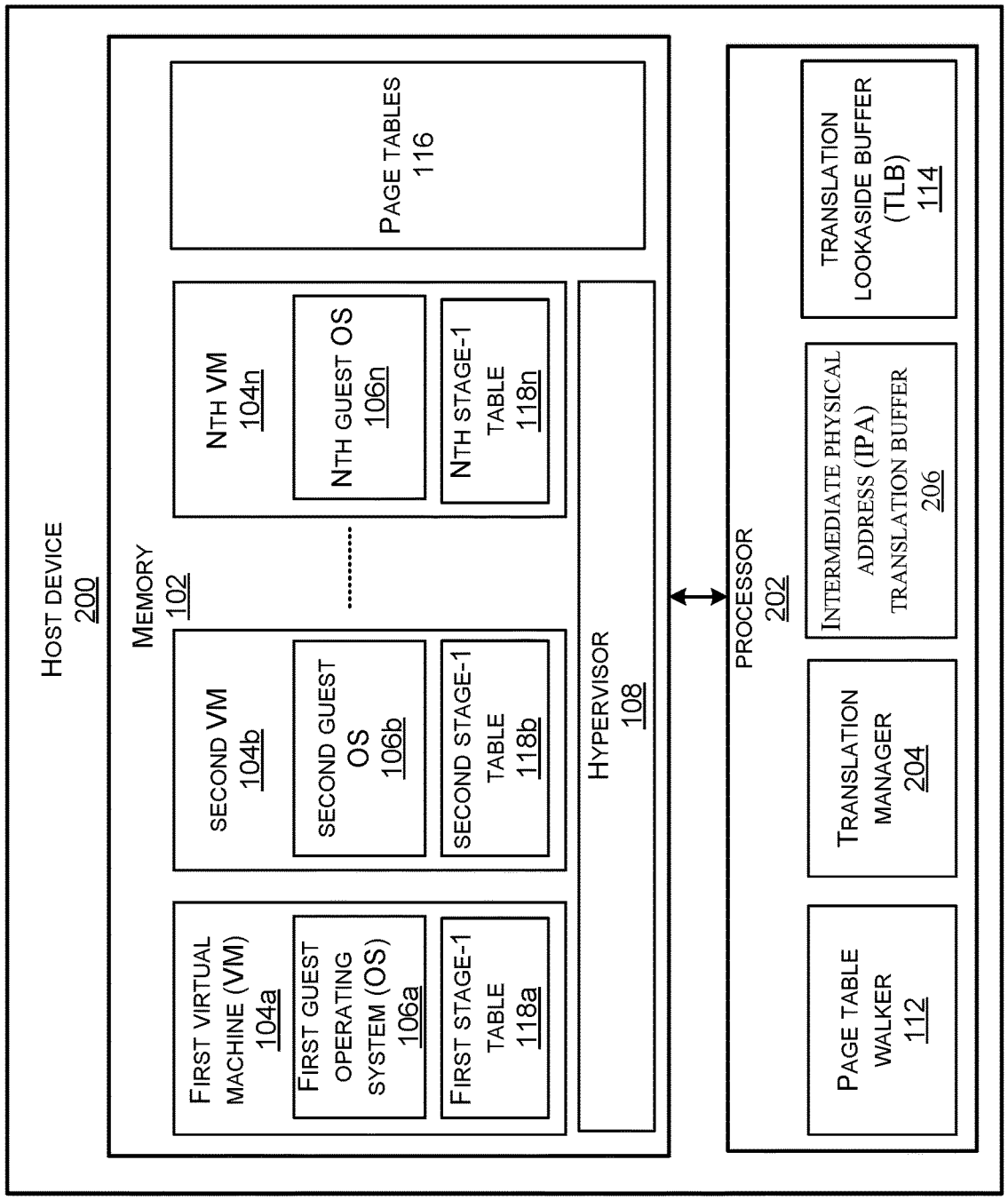
FIG. 2 illustrates a host device comprising an additional translation buffer in addition to a main translation lookaside buffer (TLB), in some embodiments of the disclosed technologies.

FIG. 2 illustrates a host device 200 comprising an additional translation buffer in addition to the main TLB, in some embodiments of the disclosed technologies. The host device 200 may include the memory 102 and a processor 202. The processor 202 may include a translation manager 204 and an IPA translation buffer 206, in addition to the page walker 112 and the TLB 114, as discussed with reference to FIG. 1. The host device 200 may be part of a computer system.

In some embodiments, the translation manager 204 may be configured to receive an IPA corresponding to a guest physical address space associated with a guest executing in a VM. For example, the guest may correspond to a first guest OS 106a executing in the first VM 104a. The first VM 104a may send a request to access the memory 102 for a transaction. The request may include a VA corresponding to a virtual address space associated with the first guest OS 106a executing in the first VM 104a. The IPA may be provided by the hypervisor 108 to update an entry in the TLB 114 corresponding to the IPA, e.g., when there is a change in the mapping between the IPA and the PA. The translation manager 204 may be further configured to determine a pointer to an entry in the TLB 114 corresponding to the IPA using the IPA translation buffer 206. The IPA translation buffer 206 may be configured to cache mappings of the IPAs to pointers for the TLB entries.

The IPA translation buffer 206 may use portions of the IPA as an index to provide the pointer that can point to an entry in the TLB corresponding to the IPA. The translation manager 204 may be further configured to identify the entry in the TLB 114 using the pointer. Identifying the entries in the TLB 114 corresponding to an IPA can allow the hypervisor 108 to modify the entry in the TLB 114 to reflect a change in the mapping between the IPA and the PA. The translation manager 204 may be further configured to modify the identified entry in the TLB 114. For example, the translation manager 204 may invalidate the identified entry in the TLB 114.

In some embodiments, the TLB 114 may be populated with the PAs corresponding to the VAs, and the IPA translation buffer 206 may be populated with the pointers corresponding to the IPAs, when the page table walker 112 initially performs the page table walk. In some implementations, an entry may be inserted into the TLB 114 using a nested or a two-dimensional page walk. For example, the page table walker 112 may walk the page tables 116 to perform a stage-1 translation to translate a VA from a virtual address space associated with a guest OS executing in a VM to an IPA from a guest physical address space associated with the guest OS, e.g., using the respective stage-1 tables 118a-118n. Next the page table walker 112 may walk the page tables 116 again to perform a stage-2 translation to translate the IPA to a PA from a physical memory space in the memory 102 using the stage-2 tables. Thus, an entry comprising the PA may be inserted into the TLB 114 based on the VA, and an entry comprising the pointer may be inserted into the IPA translation buffer 206 based on the IPA.

In some embodiments, the IPA translation buffer 206 may only store the pointers for the entries in the TLB 114 and not for the micro TLB. In most instances, the micro TLB, being smaller in size, can be completely invalidated as it can be quickly refilled by the TLB 114, and therefore, it may not be necessary to invalidate specific entries of the micro TLB corresponding to the IPA.

In some embodiments, the translation manager 204 may over-invalidate the entries in the TLB 114. For example, in some instances, the pointer may include information about additional entries in the TLB 114 including the identified entry which can be invalidated. Thus, certain embodiments can allow the hypervisor 108 to invalidate a specific entry or, a number of entries without invalidating all the TLB entries. This is further explained with reference to FIG. 3.

Figure 3:
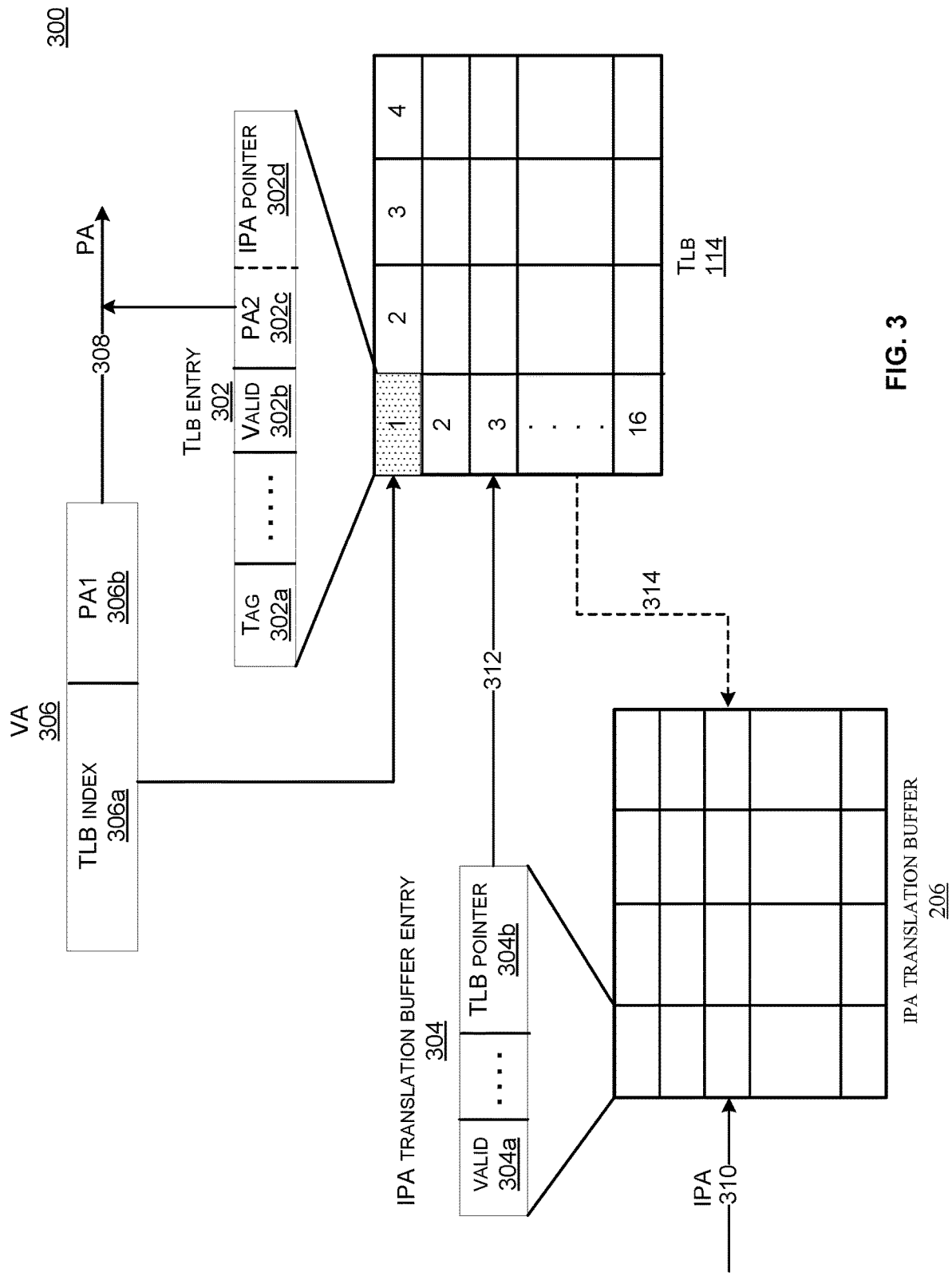
FIG. 3 illustrates the use of an intermediate physical address (IPA) translation buffer to identify an entry in the TLB corresponding to an IPA, according to some embodiments of the disclosed technologies.

FIG. 3 illustrates the use of the IPA translation buffer to identify an entry in the TLB corresponding to an IPA, according to some embodiments of the disclosed technologies.

The TLB 114 may include entries configured to store mappings between the VAs and the PAs. FIG. 3 shows an example TLB entry 302 of the TLB 114, which is implemented as a four-way set associate cache. As shown in FIG. 3, an example implementation of the TLB 114 includes sixty four entries configured as four columns (e.g., four-ways) and sixteen rows (e.g., sixteen-sets). The TLB entry 302 may include a tag 302a, a valid bit 302b, a physical address PA2 302c, and an optional IPA pointer 302d. The tag 302a may be an index identifier for the TLB entries. In some implementations, the valid bit 302b may be used to indicate if the TLB entry is valid. For example, the valid bit 302b may be set if a page with that entry is in the memory 102. For example, some TLB entries may become invalid on a context switch due to a change in the address space since the VA to PA mapping may be different. The translation manager 204 may invalidate an entry by toggling the valid bit 302b of the TLB entry. The PA2 302c may correspond to a portion of the physical address corresponding to the VA 306. The IPA pointer 302d may include a pointer to an entry in the IPA translation buffer 206 corresponding to the TLB entry 302. The IPA pointer 302d may be used to invalidate the corresponding entry in the IPA translation buffer 206 when the TLB entry 302 is invalidated or evicted. The TLB entry 302 may include other bits (e.g., a process identifier), which are not shown here for the purposes of simplicity. It will be noted that the size (e.g., number of bits) for the tag 302a, and the PA2 302c may be architecture and implementation specific.

The TLB 114 may be indexed using a VA 306 as part of the request sent by the first VM 104a to access the memory 102. In some implementations, portions of the VA 306 may be interpreted as a TLB index 306a and a PA1 306b. For example, the TLB index 306a may include a first portion of the VA 306 bits (e.g., a virtual page number), and the PA1 306b may include a second portion of the VA bits 306 (e.g., a page offset). The VA 306 may include other bits, which are not shown here for the purposes of simplicity. It will be noted that the size (e.g., number of bits) for the TLB index 306a and the PA1 306b may be architecture and implementation specific.

In some embodiments, the TLB index 306a may be used as an index to the TLB 114 to look up for an entry which is storing the corresponding mapping to the PA. For example, the TLB index 306a may be compared with the TAG 302a to determine if there is a match (e.g., TLB hit). If there is a match, the TLB 114 may provide the PA2 302c corresponding to the VA 306. The PA2 302c may be concatenated with the PA1 306b to produce a physical address PA 308 corresponding to the VA 306, which can be sent to the memory 102. If there is no match, a page fault occurs and the page table walker 112 may perform the translation and update the TLB 114 with the mapping. In certain implementations, the TLB 114 may be fully associative, and the TLB index 306a may be used to match against the TAG 302a in the TLB entry 302.

The IPA translation buffer 206 may include entries configured to store mappings between the IPAs and the pointers to the TLB entries corresponding to the IPAs. For example, in one instance, an IPA 310 may be provided by the hypervisor 108 for a request to invalidate an entry in the TLB 114 due to a change in the mapping between the IPA 310 and the corresponding PA. FIG. 3 shows an example IPA translation buffer entry 304 of the IPA translation buffer 206. The IPA translation buffer entry 304 may include a valid bit 304a, and a TLB pointer 304b. The IPA translation buffer entry 304 may include other bits, which are not shown here for the purposes of simplicity. It will be noted that the size (e.g., number of bits) for the TLB pointer 304b may be architecture and implementation specific. The valid bit 304a may include similar functionality as the valid bit 302b of the TLB entry 302.

In some embodiments, portions of the IPA 310 may be used as an index to the IPA translation buffer 206 to look up an entry which is storing a pointer corresponding to the IPA 310. For example, the portions of the IPA 310 may be used as an index to determine if there is a match and the TLB pointer 304b may be obtained when there is a match. If there is no match, the hypervisor 108 may update the IPA translation buffer 206 with the mapping. In some implementations, a first portion of the IPA 310 (e.g., most significant bits) may be used as the index to the IPA translation buffer 206, and a second portion of the IPA 310 (e.g., lower significant bits) may be used as the page offset.

The TLB pointer 304b may include identification information for a corresponding entry in the TLB 114. In some embodiments, in order to identify a TLB entry, the TLB pointer 304b may include information associated with a set, or a way associated with set for the entry in the TLB 114, and may provide an index 312 to the TLB 114 to look up that entry. For example, as shown in FIG. 3, the TLB pointer 304b corresponding to the TLB entry 302 may include information that the TLB entry 302 belongs to a first way out of the four-ways, and a first set out of the sixteen-sets.

In some embodiments, when it is acceptable to over-invalidate the TLB entries, an incomplete identification of the entries may be stored in order to save storage area. For example, in some instances, the TLB pointer 304b may only include information for a set in the TLB 114 associated with the identified entry. Referring back to the previous example, the TLB pointer 304b corresponding to the TLB entry 302 may only include information that the TLB entry 302 belongs to a first set out of the sixteen-sets. In other instances, the TLB pointer 304b may only include information for a way associated in the TLB for the identified entry. For example, the TLB pointer 304b corresponding to the TLB entry 302 may only include information that the TLB entry 302 belongs to a first way out of the four-ways. Thus, the translation manager 204 may be able to identify an entry, a set including the entry, or a way including the entry in the TLB 114 using the TLB pointer 304b corresponding to the IPA 310. Thus, in some embodiments, the translation manager 204 may modify the identified entry by invalidating the identified entry, all the entries in the way, or all the ways in the set using the pointer. The decision to include the information corresponding to the set, way, or both for invalidation may generally depend upon the trade-off between the complexity and the overhead due to the over-invalidation of the entries. In some embodiments, the decision may be based on the system design and may not be changeable by the hypervisor 108.

In some embodiments, one pointer may be used to identify one TLB entry if a page size of the mapping between the VAs and the IPAs is the same for the mapping between the IPAs and the PAs. However, if the page size for the mapping between the IPAs and the PAs is larger, multiple pointers may be used to identify one TLB entry. The translation manager 204 may be configured to invalidate only the identified entry, all the entries in the set that includes the identified entry, or all the entries in the way that includes the identified entry, e.g., by toggling the respective valid bit 302b of the entries.

Generally, the TLB 114 and the IPA translation buffer 206 may be implemented as caching structures. However, this may introduce a possibility of a conflict since there may not be a one-to-one correspondence between a set in the TLB 114 and a set in the IPA translation buffer 206 in some instances. For example, even if the TLB 114 and the IPA translation buffer 206 are of the same size, there may be more number of entries in one than the other at any point in time. Thus, in some instances, a valid entry in the TLB 114 may have to be removed or evicted if a corresponding pointer to that TLB entry does not exist in the IPA translation buffer 206. Optionally, in such cases, the TLB 114 can be completely invalidated, so the TLB 114 and the IPA translation buffer 206 may be populated again.

In some instances, when an entry in the TLB 114 is removed or invalidated, the translation manager 204 may be further configured to remove the corresponding entry in the IPA translation buffer 206. For example, in some implementations, each TLB entry in the TLB 114 may include an optional pointer that points to a corresponding entry in the IPA translation buffer 206. As shown in FIG. 3, the TLB entry 302 may store the optional IPA pointer 302d, which can be provided to the IPA translation buffer 206 via an index 314 to invalidate or remove an entry in the IPA translation buffer 206 corresponding to the invalidated TLB entry. In some implementations, the index 314 may include information corresponding to a set and a way of the entry to be removed in the IPA translation buffer 206. In some implementations, the valid 304a bit of the entry may be toggled to invalidate the entry.

In some embodiments, if a micro TLB is present, any invalidations of the TLB entries may result in all the entries in the micro TLB to be invalidated. For example, in most instances, the micro TLB may get updated frequently, therefore, instead of tracking the entries in the micro TLB, flushing out the micro TLB may not result in a significant overhead.

Figure 4:
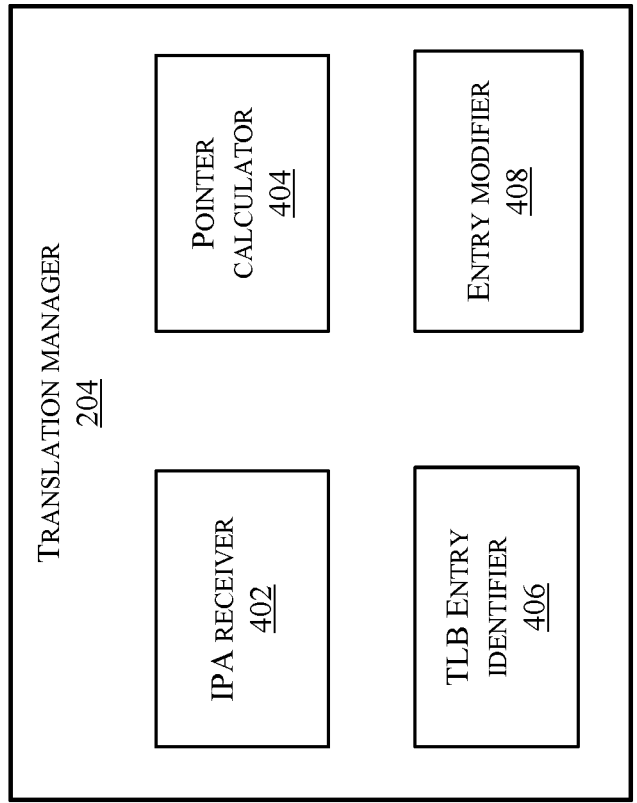
FIG. 4 illustrates components of a translation manager, in some embodiments of the disclosed technologies.

FIG. 4 illustrates a block diagram 400 to show components of the translation manager 204, in some embodiments of the disclosed technologies.

The translation manager 204 may include an IPA receiver 402, a pointer calculator 404, a TLB entry identifier 406, and an entry modifier 408. Note that some or all the components of the translation manager 204 may be implemented in hardware, software, or a combination thereof. For example, in some embodiments, functionalities provided by some or all the components of the translation manager 204 may be implemented by executing the instructions stored in a computer readable medium. For example, the instructions may be executed by the processor 110 and the computer readable medium may be part of the memory 102, as discussed with reference to FIG. 2.

The IPA receiver 402 may be configured to receive an IPA corresponding to a guest physical address space associated with a guest operating system. As discussed with reference to FIG. 2, the IPA receiver 402 may be configured to receive an IPA corresponding to a guest physical address space associated with any of the guest OSs 106a-106n executing in their respective VM 104a-104n. For example, the IPA may be provided by the hypervisor 108 in a request to modify a TLB entry. As discussed with reference to FIG. 3, the hypervisor 108 may request to modify the TLB entry in order to invalidate the TLB entry, when the underlying IPA to PA mapping has changed.

The pointer calculator 404 may be configured to determine a TLB pointer to an entry in the TLB 114 corresponding to the IPA using the IPA translation buffer 206. The pointer calculator 404 may use portions of the IPA as an index to the IPA translation buffer 206 to determine the TLB pointer. As discussed with reference to FIG. 3, the IPA translation buffer 206 may include entries similar to the IPA translation buffer entry 304. The pointer calculator 404 may determine the TLB pointer 304b from the IPA translation buffer entry 304 using the portions of the IPA 310 as the index to the IPA translation buffer 206.

The TLB entry identifier 406 may be configured to identify one or more entries in the TLB 114 using the TLB pointer. For example, the TLB pointer 304b may store identification information to identify a TLB entry. The TLB pointer 304b may be provided as the index 312 to the TLB 114 to look up the entry corresponding to the IPA. As discussed with reference to FIG. 3, the identification information may be complete or incomplete to identify one entry, a set of entries that includes the identified entry, or a way that includes the identified entry. In some embodiments, the TLB entry identifier 406 may also be configured to identify an entry in the TLB 114 that has been invalidated. For example, the TLB entry identifier 406 may determine if an entry in the TLB 114 has been invalidated based on the valid bit of the TLB entry. As discussed with reference to FIG. 3, when a TLB entry is invalidated in the TLB 114, a corresponding entry in the IPA translation buffer 206 may be invalidated, e.g., using the index 314 provided by the TLB 114 based on the optional IPA pointer 302d for the invalidated TLB entry.

The entry modifier 408 may be configured to modify the identified one or more entries in the TLB 114 or in the IPA translation buffer 206. In some embodiments, the entry modifier 408 may be configured to modify the identified entry by invalidating all the ways in the set, or all the entries in the set, based on the TLB pointer 304b. In some embodiments, modifying the entry may include invalidating the entry. For example, a valid bit in the TLB entry may be toggled to invalidate the identified entry in the TLB 114. Similarly, the valid 304a bit may be toggled to invalidate the entry in the IPA translation buffer 206. Note that other implementations of invalidating an entry are possible without deviating from the scope of the disclosed technologies. In some instances, the entry modifier 408 may invalidate an entry in the IPA translation buffer 206, which is storing the pointer corresponding to an invalidated TLB entry in the TLB 114.

Figure 5:
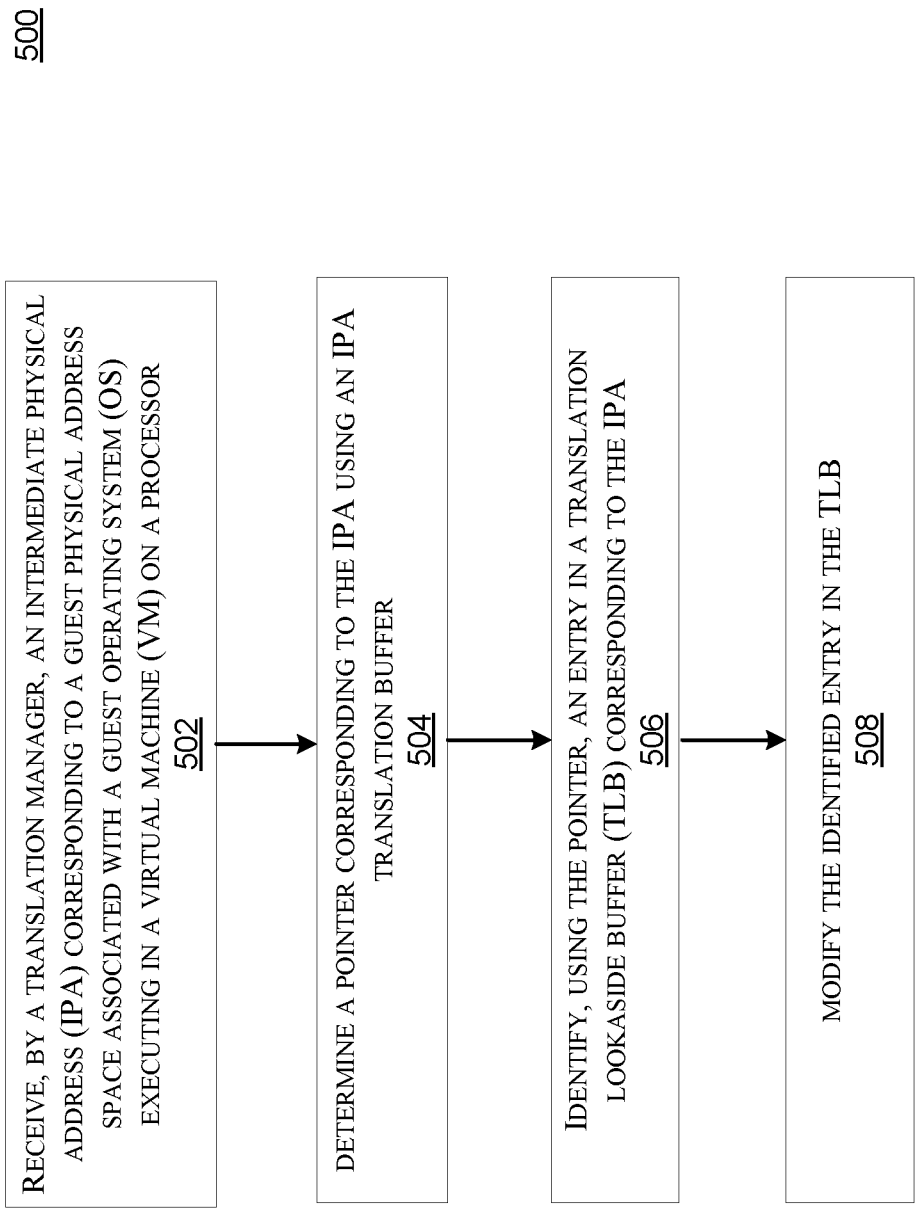
FIG. 5 illustrates a method executed by the translation manager, in some embodiments of the disclosed technologies.

FIG. 5 illustrates a method 500 executed by the translation manager 204, in some embodiments of the disclosed technologies.

In step 502, the translation manager 204 may receive an IPA corresponding to a guest physical address space associated with a guest OS executing in a VM on a processor. As discussed with reference to FIGS. 2-4, the IPA receiver 402 may receive the IPA 310. The IPA 310 may correspond to a guest physical address space associated with the first guest OS 106a executing in the first VM 104a. The IPA 310 may be provided by the hypervisor 108 for a request to invalidate an entry in the TLB 114 corresponding to the IPA 310. For example, the hypervisor 108 may request to invalidate an entry when the IPA to PA mapping has changed due to live migration of the first VM 104a, over commitment of the memory, activity tracking using a dirty bit, or any other relevant reason.

In step 504, the translation manager 204 may determine a pointer corresponding to the IPA using the IPA translation buffer 206. The pointer calculator 404 may determine the TLB pointer 304b to a TLB entry corresponding to the IPA 310 using the IPA translation buffer 206. For example, the pointer calculator 404 may use portions of the IPA 310 as an index to the IPA translation buffer 206 to determine the TLB pointer 304b from the IPA translation buffer entry 304. In some implementations, the pointer calculator 404 may use lower significant bits (e.g., twelve bits) of the IPA 310 as the page offset, and remaining bits of the IPA 310 as the index to the IPA translation buffer.

In step 506, the translation manager 204 may identify, using the pointer, an entry in the TLB 114 corresponding to the IPA 310. The TLB entry identifier 406 may identify an entry using the TLB pointer 304b. The TLB pointer 304b may point to the exact entry corresponding to the IPA 310, or a group of entries that include the identified entry. For example, the group of entries may correspond to a particular set, or a particular way in the TLB 114 that includes the identified entry.

In step 508, the translation manager 204 may modify the identified entry in the TLB 114. The entry modifier 408 may invalidate the identified exact entry or a group of entries in the TLB 114. For example, the entry modifier 408 may toggle the valid 302*b* bit for each entry to be invalidated.

Thus, as discussed with reference to FIGS. 1-5, some embodiments can allow identifying and validating an entry in the TLB corresponding to an IPA, when there is a change in the IPA to PA mapping as determined by the hypervisor. Some embodiments can allow over-invalidating the entries in the TLB, which may still be beneficial as compared to invalidating all the entries since only invalidated entries may need to be populated. This can improve system performance since the whole TLB need not be refilled as frequently.

Figure 6:
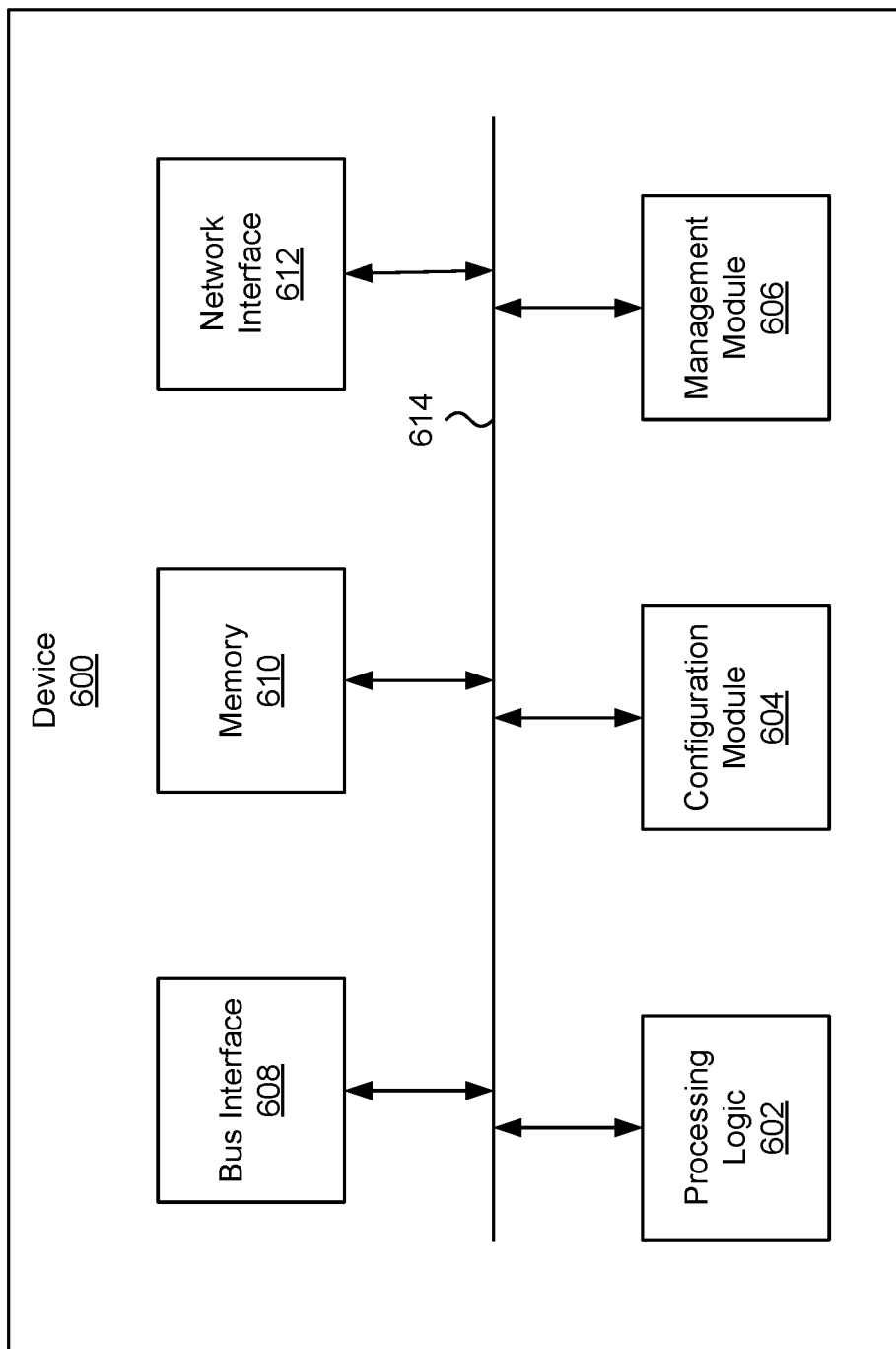
FIG. 6 illustrates an example of a device, according to certain aspects of the disclosure.

FIG. 6 illustrates an example of a device 600. Functionality and/or several components of the device 600 may be used without limitation with other embodiments disclosed elsewhere in this disclosure, without limitations. In some implementations, the device 600 may include functionality and/or some components of the apparatus 200, as discussed with reference to FIG. 2.

In one example, the device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The device 600 may include additional modules, not illustrated here, such as components discussed with respect to the nodes disclosed in FIG. 7. In some implementations, the device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the device 600, while in other cases some or all of the memory may be external to the device 600. The memory 610 may store an operating system comprising executable instructions that, when executed by the processing logic 602, provides the execution environment for executing instructions providing networking functionality for the device 600. The memory may also store and maintain several data structures and routing tables for facilitating the functionality of the device 600.

In some implementations, the configuration module 604 may include one or more configuration registers. Configuration registers may control the operations of the device 600. In some implementations, one or more bits in the configuration register can represent certain capabilities of the device 600. Configuration registers may be programmed by instructions executing in the processing logic 602, and/or by an external entity, such as a host device, an operating system executing on a host device, and/or a remote device. The configuration module 604 may further include hardware and/or software that control the operations of the device 600.

In some implementations, the management module 606 may be configured to manage different components of the device 600. In some cases, the management module 606 may configure one or more bits in one or more configuration registers at power up, to enable or disable certain capabilities of the device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the device 600 may include multiple network interface modules, each configured to communicate with a different network. For example, in these implementations, the device 600 may include a network interface module for communicating with a wired Ethernet network, a wireless 802.11 network, a cellular network, an Infiniband network, etc.

The various components and modules of the device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 7.

Figure 7:
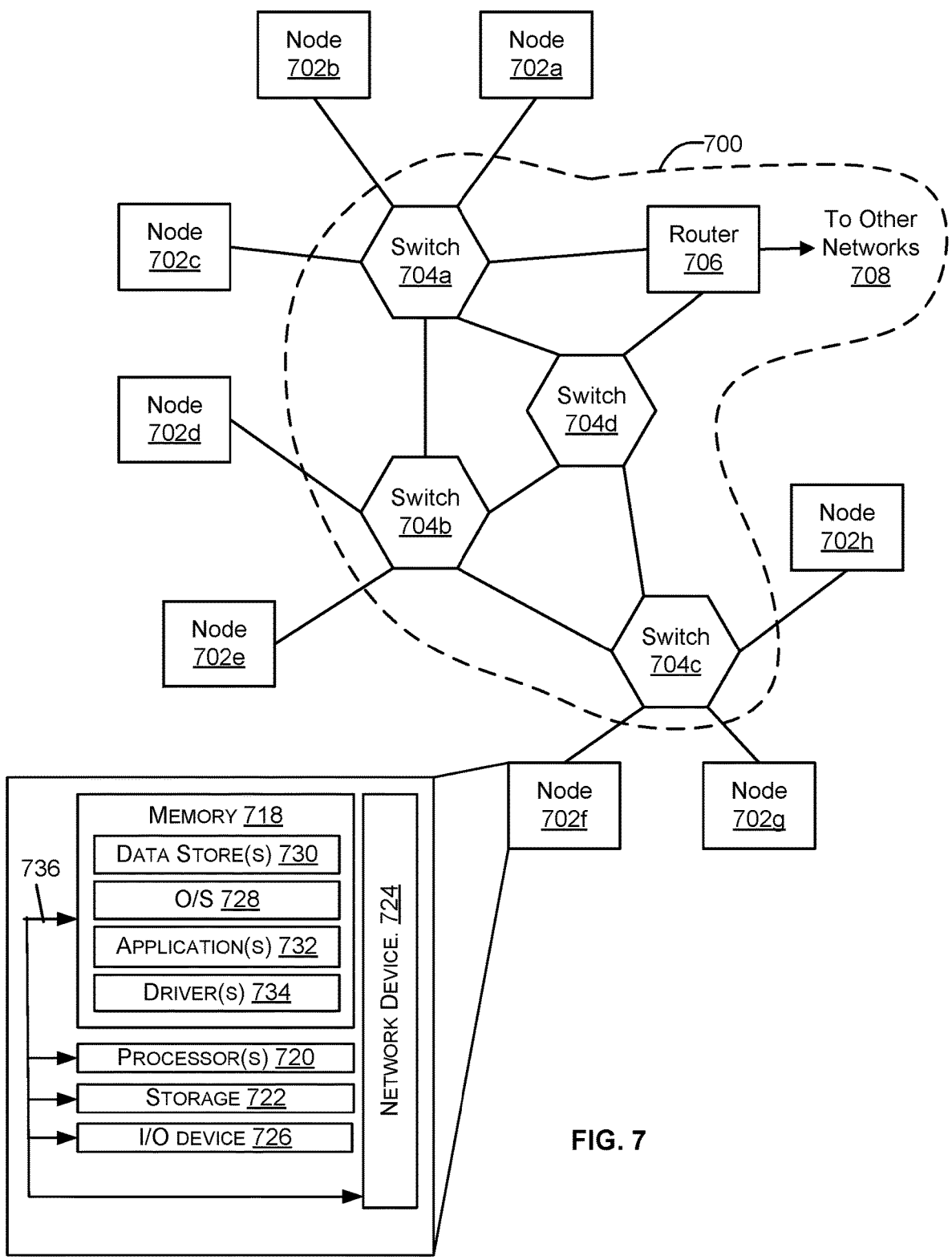
FIG. 7 illustrates an example architecture for features and systems described herein that includes one or more service provider computers and/or a user device connected via one or more networks, according to certain aspects of the disclosure.

FIG. 7 illustrates a network 700, illustrating various different types of devices 600 of FIG. 6, such as nodes comprising the device 600, switches and routers. In certain embodiments, the network 700 may be based on a switched architecture with point-to-point links. As illustrated in FIG. 7, the network 700 includes a plurality of switches 704a-704d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 704a-704d may be connected to a plurality of nodes 702a-702h and provide multiple paths between any two nodes.

The network 700 may also include one or more network devices for connection with other networks 708, such as other subnets, LANs, wide area networks (WANs), or the Internet, and may be referred to as routers 706. Routers use headers and forwarding tables to determine the best path for forwarding the packets, and use protocols such as internet control message protocol (ICMP) to communicate with each other and configure the best route between any two devices.

In some examples, network(s) 700 may include any one or a combination of many different types of networks, such as cable networks, the Internet, wireless networks, cellular networks and other private and/or public networks. Interconnected switches 704a-704d and router 706, if present, may be referred to as a switch fabric, a fabric, a network fabric, or simply a network. In the context of a computer network, terms "fabric" and "network" may be used interchangeably herein.

Nodes 702a-702h may be any combination of host systems, processor nodes, storage subsystems, and I/O chassis that represent user devices, service provider computers or third party computers.

User devices may include computing devices to access an application 732 (e.g., a web browser or mobile device application). In some aspects, the application 732 may be hosted, managed, and/or provided by a computing resources service or service provider. The application 732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 708. Additionally, the user device(s) may be part of the distributed system managed by, controlled by, or otherwise part of the service provider computer(s) (e.g., a console device integrated with the service provider computers).

The node(s) of FIG. 7 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 702a-702h may include at least one memory 718 and one or more processing units (or processor(s) 720). In some implementations, functionality of some or all the components of the host device 200 from FIG. 2 may be implemented by each of the node(s) 702a-702h. The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared. In some embodiments, the processor(s) 720 may also include the translation manager 204 and the IPA translation buffer, as discussed with reference to FIG. 2-FIG. 5.

The memory 718 may store program instructions that are loadable and executable on the processor(s) 720, as well as data generated during the execution of these programs. Depending on the configuration and type of the node(s) 702a-702h, the memory 718 may be volatile (such as RAM) and/or non-volatile (such as ROM, flash memory, etc.). The memory 718 may include an operating system 728, one or more data stores 730, one or more application programs 732, one or more drivers 734, and/or services for implementing the features disclosed herein. In some implementations, the memory 718 may also include the page tables 116 as discussed with reference to FIG. 1 and FIG. 2.

The operating system 728 may support nodes 702a-702h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 728 may also be a proprietary operating system.

The data stores 730 may include permanent or transitory data used and/or operated on by the operating system 728, application programs 732, or drivers 734. Examples of such data include web pages, video data, audio data, images, user data, and so on. The information in the data stores 730 may, in some implementations, be provided over the network(s) 708 to user devices 704. In some cases, the data stores 730 may additionally or alternatively include stored application programs and/or drivers. Alternatively or additionally, the data stores 730 may store standard and/or proprietary software libraries, and/or standard and/or proprietary application user interface (API) libraries. Information stored in the data stores 730 may be machine-readable object code, source code, interpreted code, or intermediate code.

The drivers 734 include programs that may provide communication between components in a node. For example, some drivers 734 may provide communication between the operating system 728 and additional storage 722, network device 724, and/or I/O device 726. Alternatively or additionally, some drivers 734 may provide communication between application programs 732 and the operating system 728, and/or application programs 732 and peripheral devices accessible to the service provider computer. In many cases, the drivers 734 may include drivers that provide well-understood functionality (e.g., printer drivers, display drivers, hard disk drivers, Solid State Device drivers). In other cases, the drivers 734 may provide proprietary or specialized functionality.

The service provider computer(s) or servers may also include additional storage 722, which may include removable storage and/or non-removable storage. The additional storage 722 may include magnetic storage, optical disks, solid state disks, flash memory, and/or tape storage. The additional storage 722 may be housed in the same chassis as the node(s) 702a-702h or may be in an external enclosure. The memory 718 and/or additional storage 722 and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718 and the additional storage 722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 718 and the additional storage 722 are examples of computer storage media. Additional types of computer storage media that may be present in the node(s) 702a-702h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 702a-702h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 702a-702h may also include I/O device(s) 726, such as a keyboard, a mouse, a pen, a voice input device, a touch input device, a display, speakers, a printer, and the like. The node(s) 702a-702h may also include one or more communication channels 736. A communication channel 736 may provide a medium over which the various components of the node(s) 702a-702h can communicate. The communication channel or channels 736 may take the form of a bus, a ring, a switching fabric, or a network.

The node(s) 702a-702h may also contain network device(s) 724 that allow the node(s) 702a-702h to communicate with a stored database, another computing device or server, user terminals and/or other devices on the network(s) 700. The network device(s) 724 of FIG. 7 may include similar components discussed with reference to the device 600 of FIG. 6.

In some implementations, the network device 724 is a peripheral device, such as a PCI-based device. In these implementations, the network device 724 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 724 may be connected to a computing system using a PCIe interface.

A PCI-based device may include one or more functions. A "function" describes operations that may be provided by the network device 724. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 724 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A host device comprising:
memory configured to store instructions for a hypervisor and virtual machines (VMs), each VM configured to execute a respective guest operating system (OS), wherein
each guest OS executing within a respective VM is configured to control mapping of virtual addresses (VAs) corresponding to a virtual address space associated with the guest OS to intermediate physical addresses (IPAs) corresponding to a guest physical address space associated with the guest OS, and
the hypervisor is configured to control mapping of the IPAs to physical addresses (PAs) corresponding to a physical address space in the memory; and
a processor comprising:
a translation lookaside buffer (TLB) including entries configured to store mappings between the VAs and the PAs;
an IPA translation buffer including entries, wherein the entries in the IPA translation buffer are configured to store pointers to the entries in the TLB corresponding to the IPAs;
a page table walker configured to:
populate the TLB with the mappings of the VAs to the PAs, and
populate the IPA translation buffer with mappings of the IPAs to the pointers; and
a translation manager configured to:
receive an IPA from the hypervisor to invalidate an entry in the TLB corresponding to the IPA;
determine a pointer to the entry in the TLB corresponding to the IPA using the IPA translation buffer;
identify the entry in the TLB using the pointer; and
invalidate the identified entry in the TLB.

2. The host device of claim 1, wherein the pointer includes information corresponding to a set or to a way associated with the entry in the TLB.

3. The host device of claim 1, wherein the translation manager is further configured to invalidate an entry in the IPA translation buffer corresponding to an index provided by the TLB.

4. The host device of claim 1, wherein the translation manager determines the pointer using a portion of the IPA as an index to the IPA translation buffer.

5. An apparatus comprising:
a translation lookaside buffer (TLB) including entries configured to store mappings between virtual addresses (VAs) and physical addresses (PAs), wherein
the VAs correspond to a virtual address space associated with a guest operating system executing in a virtual machine (VM) executing on a processor, and
the PAs correspond to a physical address space in a memory coupled to the processor;
a page table walker configured to:
populate the TLB with the mappings of the VAs to the PAs, and
populate an intermediate physical address (IPA) translation buffer with mappings of the IPAs to pointers to entries in the TLB;
and
a translation manager coupled to the TLB, the translation manager configured to:
receive an IPA corresponding to a guest physical address space associated with the guest operating system;
determine a pointer corresponding to the IPA using an IPA translation buffer;
identify, using the pointer, an entry in the TLB corresponding to the IPA; and
modify the identified entry in the TLB.

6. The apparatus of claim 5, wherein the IPA translation buffer stores the pointer to the entry in the TLB corresponding to the IPA.

7. The apparatus of claim 6, wherein the translation manager determines the pointer using a portion of the IPA as an index to the IPA translation buffer.

8. The apparatus of claim 5, wherein modifying the identified entry in the TLB includes invalidating the entry in the TLB.

9. The apparatus of claim 5, wherein the pointer includes information for a set in the TLB associated with the identified entry, and wherein the translation manager is further configured to modify the identified entry by invalidating all ways in the set based on the pointer.

10. The apparatus of claim 5, wherein the pointer includes information for a way in the TLB associated with the identified entry, and wherein the translation manager is further configured to modify the identified entry by invalidating all the entries in the way based on the pointer.

11. The apparatus of claim 5, wherein the translation manager is further configured to receive the IPA when a mapping of the IPA to a PA has changed for a given VA.

12. The apparatus of claim 5, wherein the processor is configured to execute instructions stored in the memory, and wherein the translation manager is configured to receive the IPA from the processor executing the instructions for a hypervisor.

13. The apparatus of claim 5, wherein each entry in the TLB is further configured to store a respective IPA pointer to a corresponding entry in the IPA translation buffer.

14. The apparatus of claim 13, wherein the translation manager is further configured to:
determine that a given entry in the TLB has been invalidated; and
invalidate the corresponding entry in the IPA translation buffer based on the respective IPA pointer for the given entry in the TLB.

15. The apparatus of claim 5, wherein the TLB, the translation manager, and the IPA translation buffer are part of the processor.

16. A computer-implemented method comprising:
populating, by a page table walker, a translation lookaside buffer (TLB) with mappings of virtual addresses (VAs) corresponding to a virtual address space associated with a guest OS executing in a virtual machine (VM) executing on a processor to physical addresses (PAs) corresponding to a physical address space in a memory coupled to the processor, and populating an intermediate physical address (IPA) translation buffer with mappings of the IPAs to pointers to entries in the TLB;
receiving, by a translation manager, an IPA corresponding to a guest physical address space associated with the guest OS;
determining a pointer to an entry in the TLB corresponding to the IPA using the IPA translation buffer, wherein the IPA translation buffer includes entries configured to store the pointers to the entries in the TLB corresponding to the IPAs;
identifying, using the pointer, the entry in the TLB corresponding to the IPA; and
modifying the identified entry in the TLB.

17. The method of claim 16, wherein modifying the identified entry in the TLB includes invalidating the entry in the TLB.

18. The method of claim 16, wherein the translation manager receives the IPA from a hypervisor executing on the processor.

19. The method of claim 16, further comprising:
   determining that a given entry in the TLB has been invalidated; and
   invalidating an entry in the IPA translation buffer corresponding to the given entry in the TLB based on an IPA pointer stored in the given entry in the TLB.

20. The method of claim 16, wherein determining the pointer includes using a portion of the IPA as an index to the IPA translation buffer.

* * * * *